Figure 1:
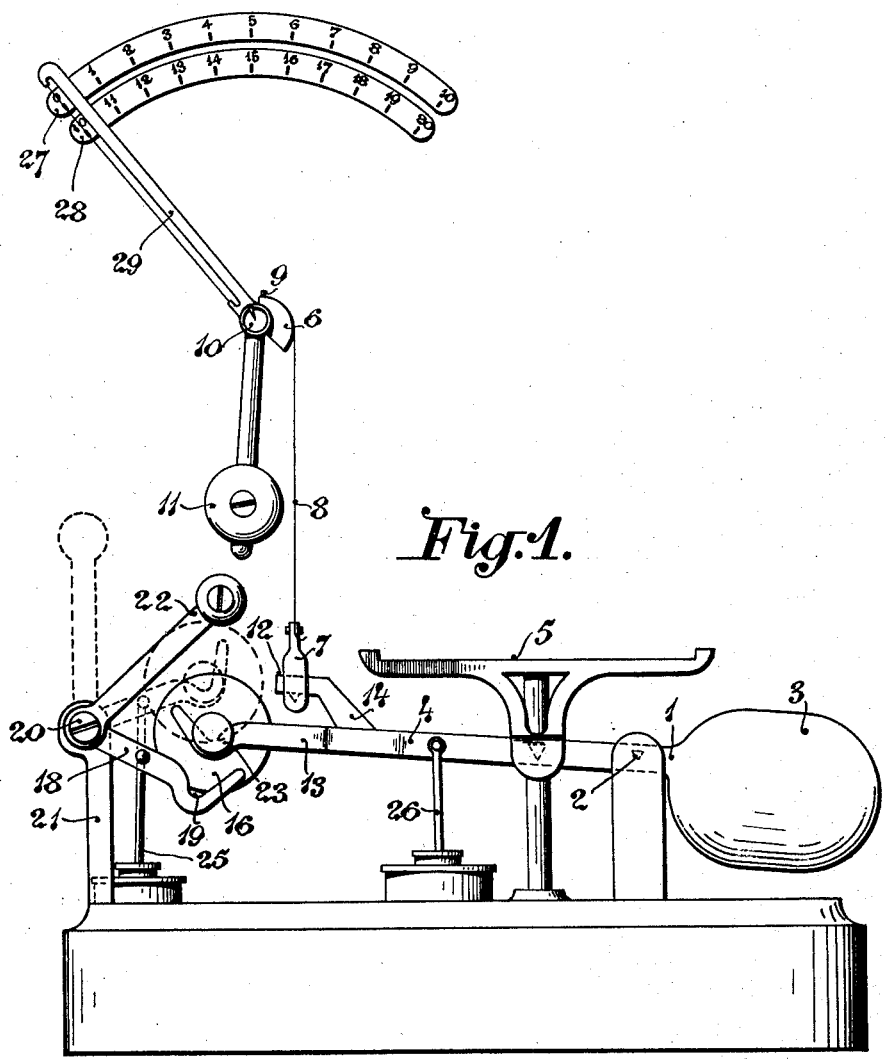

S. WISTOFT.
PENDULUM SCALE.
APPLICATION FILED OCT. 7, 1921.

1,414,764.

Patented May 2, 1922.
2 SHEETS—SHEET 1.

Inventor
S. Wistoft
By Marks & Clerk
Attys.

S. WISTOFT.
PENDULUM SCALE.
APPLICATION FILED OCT. 7, 1921.

1,414,764.

Patented May 2, 1922.
2 SHEETS—SHEET 2.

Inventor
S. Wistoft
By Marks & Clerk
Attys.

UNITED STATES PATENT OFFICE.

SÖREN WISTOFT, OF COPENHAGEN, DENMARK.

PENDULUM SCALE.

1,414,764.    Specification of Letters Patent.    Patented May 2, 1922.

Application filed October 7, 1921. Serial No. 506,126.

*To all whom it may concern:*

Be it known that I, SÖREN WISTOFT, subject of the King of Denmark, residing at No. 4–6 Skt. Nikolajvej, Copenhagen, Denmark, have invented certain new and useful Improvements in Pendulum Scales, of which the following is a specification.

The present invention relates to a pendulum scale of the known kind, working on the principle that the goods placed on a tray of the scale are weighed by their weight, acting from above on a balance beam at a comparatively short distance from the pivoting point of the latter, causes a pendulum, fitted to a horizontal axis, to rock. The outer end of the said balance beam enters, namely, into the lower part of a vertical hanger, the upper end of which is by means of a flexible metal band, running over a segment, coupled to the outer end of a short arm, which extends upwards from the pivot of the pendulum, from which the said pendulum, which is fixedly attached thereto, normally hangs downward. When, now, an article is placed on the tray, the pivot of the pendulum, and with it the pendulum will be turned until the center of gravity of the latter acts on a lever of such length as compared to that on which the pull in the metal band acts, that thereby equilibrium is established with the article on the tray. The stroke of the pendulum is transmitted to a pointer, which plays over a graduated dial, so that the weight of the article can be read thereon.

It is obvious that the stroke which the said pointer makes for a given fraction of a weight unit, for example of 1 kilogram, can be the larger, the smaller the maximum load for which the scale is arranged (for practical reasons the dimensions of the scale cannot exceed certain limits), and therefrom it again appears that the weighing cannot only be more accurately but also more easily performed on account of the easier reading. In buying a scale, therefore, one of the smallest possible size will be preferred. Conditions will, however, often be such that a scale which will weigh, for example, up to 2 kilograms, will, in general, be sufficiently large for its purpose, but that instances may occur, in which the weighing power of this scale will be too small, and therefore the buyer will be obliged to buy a larger scale, whereby, however, the generally occurring weighings cannot be performed as accurately and the reading will not be as easy, as these might really be.

In the pendulum scale according to the present invention this drawback has been obviated by the arrangement that the balance beam carries, besides the usual balance weight, which is fitted to the end of its short arm, a further throw-over weight suspended in the forked extension of its long arm, which weight may, by the simple turning of a lever, be lifted from the balance beam into an inoperative position when this is desired, and the weight of this throw-over weight and that of the counter balance are thus determined, that weighings from V to 2V kg. may be performed, when the throw-over weight is in inoperative position, if the pendulum scale is normally (with the throw-over weight suspended on the balance beam) arranged to weigh up to a maximum of V kg.

The pendulum scale, of course, must be provided with two graduated dials, of which the one is used for the normally occurring weighings, at which the throw-over weight is hung on, whilst the other is used, when the throw-over weight is rendered inoperative. If, for example, the scale can, under normal conditions, weigh up to 1 kg., the corresponding dial will have graduations reading, say, 0,100,200,300 ... 1000 gr., whilst the other dial will show corresponding graduations reading 1000,1100,1200,1300 ... 2000 gr. The pointer will, in other words, stand on the first named dial at, say, 400, whilst, at the same time, it stands on the second dial at 1400. If the scale, under normal circumstances, weighs up to 2 kg. the pointer will stand on the respective dial at 400, whilst it will stand on the second dial at 2400, and so on.

The arrangement of the dials is of the known kind, and the arrangement is, likewise in known manner, such that on throwing over the weight, the user is automatically informed as to which of the two dials, which may also be of different colour, is to be used.

From the foregoing it is apparent that the one of the two dials is, with regard to its graduation, simply a continuation of the other, so that the weighings up to 2 V kg. can be performed with the same accuracy as this would be the case, if there were only one single dial, but twice as long as the one which is now used for weighing up to V kg. It will further be apparent that the operation is very simple. If, for example, an article is to be weighed on a scale which is normally intended for up to 1 kg., and the weight of the said article is assumed to be below this limit (1 kg.) but is found to be actually above the same namely 1,1 kg., the scale is at first employed in its normal setting. As soon, however, as it is observed, that the scale cannot cope with the weight of the respective article, the throw-over weight is, by the simple turning of the lever, rendered inoperative. The pointer will then immediately swing back into the position, at which it reads 1100 on the scale that is now to be used.

In the accompanying drawing a constructional form of the invention is shown, by way of example, in diagram.

Figure 2:
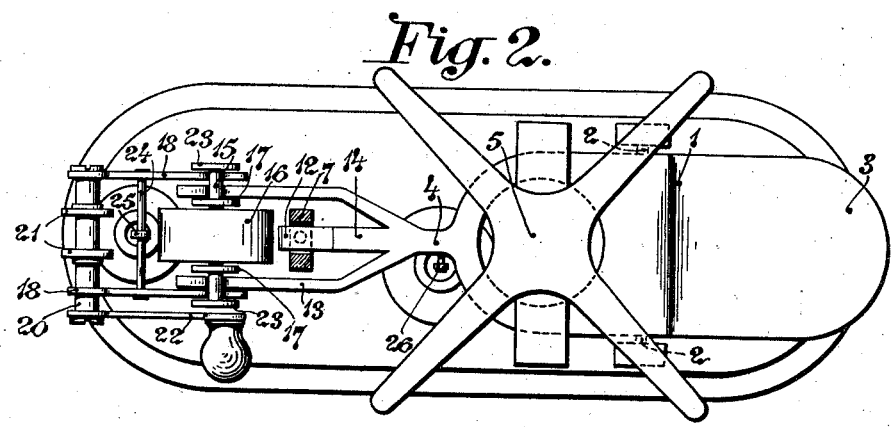

Fig. 1 is a side elevation of the scale.
Fig. 2 is a top view.

On the outer end of the short arm 1, Fig. 1, of the balance-beam rocking on the knife-edge 2 is fitted a counter-weight 3 for compensating the weight of the tray 5, the weight of which acts from above on the long arm 4, 14 of the balance-beam at a comparatively short distance from the pivoting point (the knife-edge 2) of the latter. The outer end of the said long arm 4 engages in known manner in a vertical hanger 7, to the upper end of which is fitted the lower end of a flexible metal band 8. This flexible band is, likewise in known manner, carried upwards over a segment 6 and is at its upper end attached to a short arm 9 which extends almost vertically upwards from the pivot 10 of a heavy pendulum 11. This pendulum may be assumed to be swung out so far as to balance the momentum produced by the long arm 4, 14 of the beam (up to the point on which the tray acts) and the parts resting thereon.

The outermost part 14 of the long arm of the beam is, in the constructional form shown, bent upwards with exception of a horizontal nose 12, which engages in the hanger 7. From about the point, where the parts 4 and 14 (which form one piece) of the long beam-arm meet, the part 4 is continued in form of a fork, the two parallel arms 13 of which proceed one from each side of the beam, in such a manner that their vertical center planes are at the same distance from the vertical center plane of the beam. These arms 13 which extend beyond the beam 4, 14 itself, have at their outer ends each on their upper edge an open bearing, and in these bearings normally rest pivots 15 which are diametrally opposite to one another fitted into a weight 16, namely the hereinbefore named throw-over weight. These pivots 15, each of which has a collar 17 within the respective fork-arm 13, are made so long that they can be gripped each by a respective arm 18 parallel to said fork-arms 13, turned in an opposite direction to that of said fork-arms 13, and at a greater distance from each other as these and provided at the outer ends (i. e. the end turned towards the fork-arms 13) with bearings 19 similar to those in the fork-arms 13. The pivots 15 may be in the shape of knife-edges and the bearings in the fork-arms 13 may be knife-bearings. The arms 18 are fitted to a horizontal, revoluble shaft 20, which turns in bearings in standards 21. At the one end of said shaft 20 is fitted a lever 22 having a handle, by means of which the arms 18 can be turned upwards into the position indicated by dotted lines, and the bearings 19 in these arms will then each seize the corresponding pivot 15 of the throw-over weight 16 between the corresponding fork arm 13 and the collar 23 at the end of the pivot, and thereby bodily lift the weight 16, so that it is taken off the fork arms 13. The lever 22 can be secured in any suitable manner in such position, at which the weight is lifted into inoperative position (off the fork arms 13).

In order that the throw-over weight 16 shall not act too suddenly and with a jerk on the fork arms 13, when, after having been in inoperative position, it shall be again hung on to these arms, the said arms are coupled to a cross bar 24, the center of which is linked to the piston rod 25 of a liquid brake or the like. In the same manner the balance beam is linked to the piston rod 26 of another brake, so as to prevent its oscillations being too sudden or causing jerks or knocks.

27 and 28 are two graduated dials, belonging to the scale which is here assumed to be arranged to weigh up to 1 kg., while the throw-over weight is in operative position, and which therefore can weigh from 1 kg. to 2 kg. when the said throw-over weight is in inoperative position. In the former instance the reading is taken on the dial 27 and in the second instance on dial 28. Accordingly the dial 27 is provided with a graduation marked 0,1,2 . . . , 9,10, whilst the corresponding graduations on dial 28 are marked 10,11,12, . . . 20, so that the pointer 29 which oscillates together with the pendulum 11, will stand, say at "2" on dial 27 and, at the same time, at "12" on dial 28. When the throw-over weight 16 is in operative position, the weight of the respective article being weighed will, therefore, be 200 gr., whilst it will be 1,200 gr. when the weight 16 is in inoperative position.

The demands which the scale shall meet, in accordance with what has been hereinbefore stated, must of course be obtained by properly determining the weight of the counterpoise 3 (or more correctly the momentum of the counterpoise) and of the throw-over weight 16, after the several levers, on which the forces act, have been determined with regard to the practical dimensions of the pendulum scale itself.

The momentums mentioned in the following are referred to the axis of oscillation of the balance-beam.

The momentum of the counterpoise 3 and the shorter lever arm 1 shall be called $Ml$, the momentum of the dish 5 be $Sa$, the momentum of the throw-over weight 16 be $pl$ and it shall be assumed that the maximum weight which can be weighed is V kg., when the throw-over weight 16 is in operative position, and that the momentum of the longer lever 4, 14 with the fork 13 is compensated by the pendulum 11 being swung aside a little, as shown in the drawing, when the pointer 29 stands at zero (points to "0" on dial 27). If $a$ is then the distance from the point at which the tray 5 acts on the beam to the knife-edge 2:

$$Ml = Sa + pL \quad \text{\dots\dots\dots\dots\dots\dots (1),}$$

and $$Pb = Va \quad \text{\dots\dots\dots\dots\dots\dots\dots\dots (2),}$$

as $Pb$ in equation (2) is the increase of the momentum of the pendulum, when the latter swings out on an article weighing V kg. being placed on the tray.

The total momentum will then be $$Pb + Ml = Va + Sa + pL \quad \text{\dots\dots\dots (3),}$$

and as the pendulum shall have the same stroke (the same momentum $Pb$) in case an article weighing 2V kg. is placed on the tray, when the throw-over weight 16 is in inoperative position, $$Pb + Ml = 2Va + Sa \quad \text{\dots\dots\dots\dots (4).}$$

From the equations (3) and (4) is derived $$p = V \frac{a}{L} \quad \text{\dots\dots\dots\dots\dots\dots\dots\dots (5)}$$

From equations (1) and (5), or (2) and (4) is derived $$Ml = a(S+V) \quad \text{\dots\dots\dots\dots\dots\dots (6)}$$

As, according to the foregoing L is the distance from the longitudinal axis of the pivots 15 of the weight 16 to the knife-edge 2, the equations (5) and (6) result in the plain stipulations that (a) the momentum of the throw-over weight must be equal to the momentum of the maximum weight which shall be weighed when the said weight is in operative position, and that (b) the counterpoise 3 must have such a shape and weight that if fitted to the end of the shorter beam-arm, it will, together with the said arm produce a momentum which is equal to the momentum of the said maximum weight plus the tray.

For an article of a given weight smaller than V kg., say $\frac{V}{n}$ kg., the pointer will stand in an intermediate position corresponding to a momentum $Pb^1$ of the pendulum, as weighing will be performed with the throw-over weight 16 in operative position. Then (cfr. equations (3), (5) and (6)):

$$Pb^1 + a(S+V) = \frac{V}{n}a + Sa = V\frac{a}{L} - L$$

or $$Pb^1 + a(S+V) = a\left(V + \frac{V}{n} + S\right) \text{\dots\dots(7)}$$

The weight $x$, which produces the same stroke (momentum $Pb^1$) of the pendulum, when the throw-over weight 16 is in inoperative position, is determined by the following equation (cfr. equations (4) and (6)).

$$Pb^1 + a(S+V) = xa + Sa = a(x+S) \text{\dots\dots(8)}$$

From the equation (7) and (8) follows that $$x = V + \frac{V}{n} \text{ kg.}$$

what is exactly what should be obtained with the pendulum scale.

The above stated conditions (a) and (b) consequently correspond to the fact that the pointer not only has the same stroke for the minimum weights (0 kg. and V kg.) and the maximum weights (V kg. and 2V kg.) at the two weighing modes, but also for the weights $\frac{V}{n}$ kg. and $V + \frac{V}{n}$ kg.

I claim:

In a pendulum scale, in combination with the balance beam having the usual counterpoise on its shorter arm, a throw-over weight fitted to an extension of the longer arm of said balance beam, means for lifting said throw-over weight of said extension into an inoperative position, the weight of said throw-over weight and of the said counterpoise being so determined that, if the scale is made to normally weigh up to a maximum weight of V kg. (when the said throw-over weight is hung on the said extension), weighings from V kg. to 2V kg. may be performed, when the said throw-over weight is lifted into inoperative position.

In testimony whereof I affix my signature in the presence of a witness.

SÓREN WISTOFT.

Witness:
HJ ERICHSEN.